US006476986B2

United States Patent
Smith et al.

(10) Patent No.: US 6,476,986 B2
(45) Date of Patent: Nov. 5, 2002

(54) SIX-AXIS ATTACHMENT APPARATUS AND METHOD FOR SPATIAL LIGHT MODULATORS

(75) Inventors: Steven E. Smith, Coppell, TX (US); Ronald C. Creech, DeSoto, TX (US); Jack D. Grimmett, Carrollton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/745,860

(22) Filed: Dec. 21, 2000

(65) Prior Publication Data

US 2002/0034023 A1 Mar. 21, 2002

Related U.S. Application Data

(60) Provisional application No. 60/173,261, filed on Dec. 28, 1999.

(51) Int. Cl.$^7$ .................................................. G02B 7/02
(52) U.S. Cl. ...................................... 359/827; 359/819
(58) Field of Search .............................. 359/618, 639, 359/640, 819, 822, 827, 831, 811, 820; 385/36, 136

(56) References Cited

U.S. PATENT DOCUMENTS

| | | | |
|---|---|---|---|
| 5,105,369 A | 4/1992 | Nelson | 364/525 |
| 5,583,688 A | 12/1996 | Hornbeck | 359/291 |
| 5,680,260 A | * 10/1997 | Farcella et al. | 359/819 |
| 6,034,821 A | * 3/2000 | Schenfeld | 359/618 |
| 6,181,490 B1 | * 1/2001 | Wun et al. | 359/822 |
| 6,388,823 B1 | * 5/2002 | Gaber et al. | 359/819 |

FOREIGN PATENT DOCUMENTS

| DE | 3934591 | * 4/1991 | B62D/27/06 |
|---|---|---|---|

* cited by examiner

Primary Examiner—Georgia Epps
Assistant Examiner—Saeed Seyrafi
(74) Attorney, Agent, or Firm—Charles A. Brill; Wade James Brady, III; Frederick J. Telecky, Jr.

(57) ABSTRACT

A six-axis attachment mechanism for aligning a spatial light modulator (106) within a display system. An attachment plate (100) has one or more pins (104) extending therefrom. A socket plate (108) onto which a spatial light modulator (106) is attached slides over the pins (104). The modulator is then positioned to optically align it with the remainder of the display system. As the modulator is held in alignment, a washer (110) is slid onto the pin (104) and is bonded to both the pin (104) and to the socket plate (108). Washers (110) are typically transparent to enable the use of an optically cured adhesive. Glass washers (110) allow ultraviolet radiation to reach the adhesive through the glass washer (110).

36 Claims, 2 Drawing Sheets

SIX-AXIS ATTACHMENT APPARATUS AND METHOD FOR SPATIAL LIGHT MODULATORS

This application claims priority under 35 USC § 119(e)(1) of provisional application No. 60/173,261 filed Dec. 28, 1999.

CROSS-REFERENCE TO RELATED APPLICATIONS

The following patents and/or commonly assigned patent applications are hereby incorporated herein by reference:

| Pat. No. | Filing Date | Issue Date | Title |
| --- | --- | --- | --- |
| 5,105,369 | Dec. 21, 1989 | Apr. 14, 1992 | Printing System Exposure Module Alignment Method and Apparatus of Manufacture |
| 5,583,688 | Dec. 21, 1993 | Dec. 10, 1996 | Multi-Level Digital Micromirror Device |

FIELD OF THE INVENTION

This invention relates to the field of mechanical assembly, more particularly to the alignment and attachment of image displays, particularly spatial light modulators.

BACKGROUND OF THE INVENTION

Many display systems use multiple spatial light modulators, such as liquid crystal display panels (LCDs) or digital micro mirror devices (DMDTM) to create a single full-color image. Generally a white light source is used to create a white light beam that is split, using dichroic filters, into three primary color light beams. Each primary color light beam is incident on a separate modulator and the three modulated primary color light beams are recombined to form a single full-color image bearing beam of light.

Precise alignment of the three modulators is critical to achieving a high-quality image. Current DMD-based systems use adjustable sockets. The DMDs are mounted in the sockets and a six-axis alignment is performed using the adjustment screws provided by the socket The six axes corresponding to the six degrees of freedom, three rectangular and three rotational. After each DMD is aligned, the adjustment hardware locked down using thick epoxy bonds. Unfortunately, the high illumination levels experienced by the modulations in many image projectors results in a very high operating temperature. Furthermore, the operating temperature is rarely uniform from one modulator to the next, or even from one portion of a given modulator to another portion. Both the adjustment hardware and the thick epoxy bonds holding the adjustment hardware in place tend to expand and contract a great deal over the temperature extremes, allowing the convergence to drift over time and temperature. Typical display systems require alignment to within one-half pixel. Since DMIs have a pixel size of 17 $\mu$m or less, this requires long-term alignment to within 8.51$\mu$m.

A new method of attaching and aligning modulators is needed. An acceptable method and apparatus should enable easy alignment of the modulators and be able to maintain this alignment over long periods of extreme temperature variations.

SUMMARY OF THE INVENTION

Objects and advantages will be obvious, and will in part appear hereinafter and will be accomplished by the present invention that provides a method and system for a six-axis attachment method and apparatus for spatial light modulators. One embodiment of the claimed invention provides an attachment mechanism capable of maintaining the alignment of a spatial light modulator in six axes. The mechanism comprises: at least one pin, a socket plate, a modulator, and a washer. The modulator is attached to the socket plate which has clearance holes to accept the pin. The washer slides over the pin and is bonded to the socket plate and the pin. Typically four pins are used, and are held by an attachment plate. The washer is typically transparent to allow the use of an optically curable adhesive. During the adhesive cure process, light shines through the washer and cures the optically curable adhesive. An alternative embodiment envisions a combined modulator and socket plate wherein the socket plate and clearance holes are an integral part of the modulator. While the attachment structure and method is described herein with respect to the attachment of a DMD to a prism, it can be used in virtually any application requiring a strong, stable attachment.

The disclosed attachment method and system provides a strong, reliable bond that is adjustable prior to adhesive cure. Because a minimal amount of adhesive is used, the bond tends to hold its position during and after the cure.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new modulator attachment mechanism has been developed that enables the precise alignment of multiple modulators. The new mechanism provides secure attachment and prevents alignment drift over time, temperature, and vibration. The alignment mechanism provides sufficient adjustment during the assembly and alignment process, while maintaining the thin bond lines that are critical to long-term alignment stability.

Figure 1:
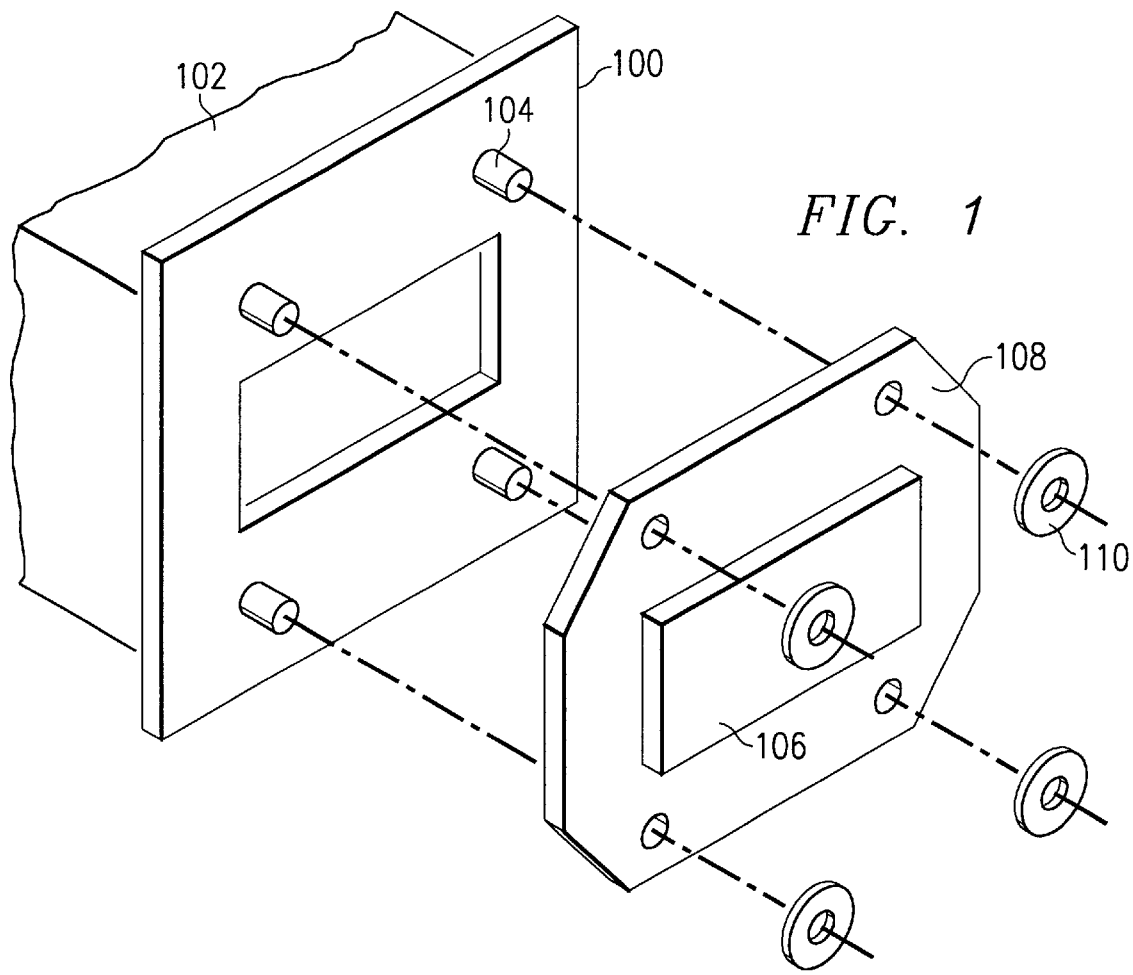
FIG. 1 is an exploded perspective view of one embodiment of the disclosed attachment mechanism.

FIG. 1 shows an exploded view of the novel attachment mechanism described herein. In FIG. 1, an attachment plate 100 is attached and aligned to a prism 102 of the display system. The prism shown in FIG. 1 is typically one of the three prisms that make up a color splitting prism assembly. Because the modulators must be aligned not only relative to each other, but also to the color splitting prism assembly, the color prism assembly is used as an anchor for the attachment plate 100. Other display system designs may not use a single prism assembly with which to align all the modulators. In the absence of a central prism assembly other portions of the display system comprise the attachment plate 100 shown in FIG. 1.

The alignment of the modulators must remain stable over the entire range of operating temperatures. To maintain alignment over temperature extremes, all of the components such as the attachment plate 100, socket plate 108, and pins 104 should be formed from a thermally stable material that closely approximates the thermal expansion characteristics of prism glass. All of the parts are typically formed from low expansion steel, which can be machined, cast, or stamped to form the necessary components.

The attachment plate 100 must be closely aligned with the attachment plates for the other two modulators (not shown). When a single member, such as a system backplane or case forms all three attachment plates, the inter-attachment plate alignment is inherently provided by the shape of the backplane or case. When three separate attachment plates 100 are used, however, the three attachment plates must be positioned so that the rather limited latitude of adjustment provided by the remaining attachment members can properly position the modulators. The attachment plate 100 of FIG. 1 typically is epoxied to the face of the color splitting prism assembly 102 as shown in FIG. 1.

Four pins 104 extend from the face of the attachment plate. The number of pins 104 used is not critical, but three is typically the minimum necessary to provide a stable attachment. Increasing the number of pins increases both the strength and complexity of the attachment mechanism.

The spatial light modulator, represented in FIG. 1 by DMD 106, is bonded to a non-adjustable socket plate 108. The socket plate 108 has four clearance holes to receive the pins 104 attached to the attachment plate 100. The clearance holes are sufficiently large to allow six-axis movement between the socket plate 108 and the attachment plate 100. As each modulator 106 is attached to the prism assembly, the socket plate 108 and modulator 106 are moved and twisted until the proper alignment is achieved.

The alignment process moves the modulator toward and away from the prism assembly to obtain uniform optical path length between the three modulators so that a single projection lens will simultaneously focus all three modulators onto the image plane. Likewise, each end of the modulator is moved up or down, right or left, and into or away from the prism face until the modulator is properly positioned. The position of the modulator is typically determined optically and monitored until each modulator is properly positioned.

Once the modulator is properly positioned, a washer 110 is slid over each pin. An adhesive bonds the washer to both the socket plate and to the pin. Thus, regardless of the size of the gap between the attachment plate 100 and the socket plate 108, or between the pin 104 and the socket plate 108, only a very thin bond line is required to secure the washer 110 to the pin 104 and socket plate 108. The modulator 106 and socket plate are held in position relative to the attachment plate 100 until the adhesive cures.

The adhesive used is typically a thermally stable epoxy that has low thermal expansion and low cure shrinkage. The adhesive must have excellent metal to glass adhesion, and a high modulus of elasticity. Although the thermal properties of the epoxy cannot approach those of either glass or steel, the thermal characteristics of the epoxy selected must be biased toward the. thermal characteristics of steel and glass.

Figure 2:
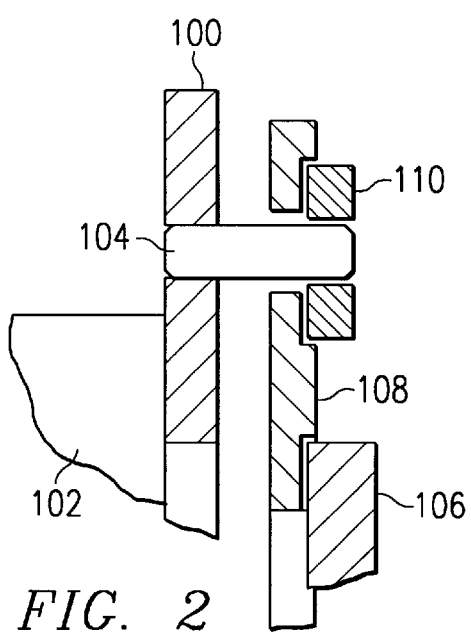
FIG. 2 is a cross-section side view of a portion of the mechanism of FIG. 1 showing the relationship between the various pieces of the mechanism as assembled.
Figure 3:
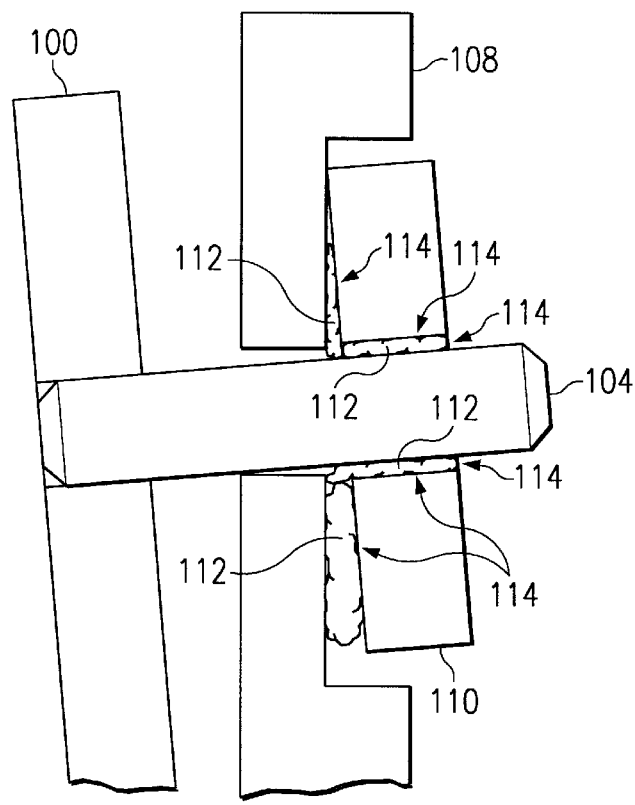
FIG. 3 is a second cross-section side view of a portion of the mechanism of FIG. 1 showing thin adhesive bond lines even in the presence of gross misalignment between the attachment plate and socket plate.

FIG. 2 is a cross-section side view of the components shown in FIG. 1 showing details and tolerances of the washer 110 and pin 104 joint. FIG. 3 is a second cross-section side view of a second joint. While the socket plate 108 is not necessarily parallel to the attachment plate 100, FIG. 3 exaggerates the angle between the two. As shown in FIG. 3, even with extreme rotation of the socket plate 108 relative to the attachment plate 100, the adhesive bond lines 112 between the washer 110 and pin 104 and between the washer 110 and socket plate 108 remain relatively thin. As described above, thin bond lines are crucial to long term alignment stability.

Other embodiments of the disclosed attachment means are possible. For example, the washers 110 could be located between the socket plate 108 and the attachment plate 100. Placing the washers 110 between the socket plate 108 and the attachment plate 100, however, makes it more difficult to assemble and optically cure the adhesive 112. Likewise, the socket plate may be defined as part of the modulator package allowing the modulator to engage the pins and be attached directly to the washers. Additionally, the clearance holes in the socket plate 108 could merely be slots.

As stated above, the modulators are held in alignment until the adhesive 112 cures. Transparent washers 110 in combination with an optically cured adhesive are preferred to enable the bond region to be flooded with light 114 and quickly cured. Glass washers 110 have a suitable thermal coefficient of expansion and provide suitable strength. The glass washers 110 are transparent to the ultraviolet light used to cure the adhesive 112 enabling the light to pass through the washer 110 and cure the adhesive 112 between the washer 110 and the socket plate 108 and pin 104. Optically curing the adhesive provides a rapid cure that limits the time the modulator must be held in place. Furthermore, optical cure methods allow room temperature bonding. Heating the components can cause shifting in the alignment due to thermal expansion. Other adhesives and non-transparent washers can be used, but may cure to slowly to be useful in production volume.

Figure 4:
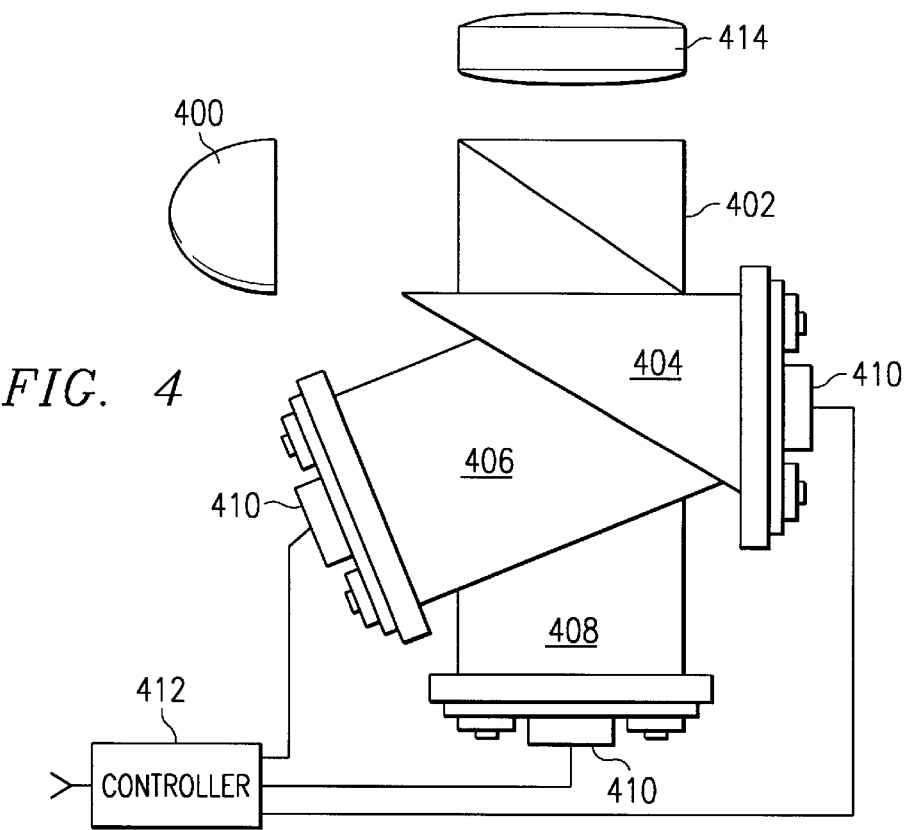
FIG. 4 is a schematic view of a three modulator display system having three digital micro mirror devices attached to the faces of a color splitting prism assembly using the attachment mechanism of FIGS. 1 and 2.

FIG. 4 is a schematic view of a three-chip display system using three of the modulator attachments described above. Of course, one fixed attachment could be used in conjunction with two to the adjustable modulator attachments described, with the two adjustable modulators being aligned to the fixed modulator. Some adjustment of all three modulators typically is necessary, however, to provide precise depth of focus adjustment across the entire face of each modulator.

In FIG. 4, a light source 400 provides a white light beam to a TIR prism assembly 402. The TIR prism assembly reflects the white light beam to a color splitting prism assembly shown as three prisms 404, 406, 408. As the white light beam passes through the color splitting prism assembly, dichroic filters on the faces of the prisms separate the light beam into three primary color light beams. Each primary color light beam is directed to a separate spatial light modulator 410. Each spatial light modulator receives electrical signals from a controller 412 that cause each modulator selectively to reflect portions of the primary color light beams. The reflected primary color light beams travel through the prisms again and are recombined into a full color modulated light beam. The full color modulated light beam passes through the TIR prism assembly without reflection and is focused onto an image plane by projection lens 414.

Thus, although there has been disclosed to this point a particular embodiment for a six-axis attachment apparatus and method therefore, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. An attachment mechanism for aligning a spatial light modulator, the mechanism comprising:
   at least one pin;
   a socket plate attached to said spatial light modulator, said socket plate having a clearance hole to receive said at least one pin;
   at least one washer bonded to said socket plate, said pin entering and bonded to said washer.

2. The attachment mechanism of claim 1, further comprising an attachment plate receiving said pin.

3. The attachment mechanism of claim 2, wherein said attachment plate is bonded to a prism.

4. The attachment mechanism of claim 1, said at least one pin comprising four pins.

5. The attachment mechanism of claim 1, said at least one pin comprising four pins attached to an attachment plate.

6. The attachment mechanism of claim 1, said washer comprising a transparent washer.

7. The attachment mechanism of claim 1, said washer comprising a glass washer.

8. The attachment mechanism of claim 1, further comprising an optically curable adhesive forming said bond between said washer and said socket plate.

9. The attachment mechanism of claim 1, further comprising an optically curable adhesive forming said bond between said washer and said at least one pin.

10. The attachment mechanism of claim 1, further comprising an optically curable adhesive, said washer optically transparent at the wavelengths required to cure said adhesive.

11. The attachment mechanism of claim 1, said socket plate comprising an integral portion of said modulator.

12. The method of attaching a modulator to a display system, said method comprising the steps of:
    providing at least one pin extending from said display system;
    providing a modulator attached to a socket plate, said socket plate having clearance holes to accept said pins;
    placing said pins in said clearance holes; and
    bonding a washer to said socket plate and said pins.

13. The method of claim 12, said step of providing at least one pin comprising the step of providing four pins.

14. The method of claim 12, said step of providing at least one pin comprising the step of providing at least one pin attached to an attachment plate.

15. The method of claim 12, said step of providing a modulation comprising the step of providing an integrated modulator and socket plate.

16. The method of claim 12, said step of bonding a washer to said socket plate comprising the step of bonding a transparent washer to said socket plate and said pins.

17. The method of claim 12, said step of bonding a washer to said socket plate comprising the step of bonding a transparent washer to said socket plate and said pins using an optically curable adhesive.

18. The method of claim 17, further comprising the step of curing said adhesive by illuminating said adhesive through said transparent washer.

19. The method of claim 17, further comprising the step of curing said adhesive by illuminating said adhesive through said transparent washer using ultraviolet light.

20. An attachment mechanism for attaching two components, the mechanism comprising:
    at least one pin attached to a first component;
    a socket plate attached to a second component, said socket plate having a clearance hole to receive said at least one pin;
    at least one washer bonded to said socket plate, said pin entering into and bonded to said washer.

21. The attachment mechanism of claim 20, further comprising an attachment plate receiving said pin.

22. The attachment mechanism of claim 20, wherein said attachment plate is bonded to said first component.

23. The attachment mechanism of claim 20, said at least one pin comprising four pins.

24. The attachment mechanism of claim 20, said at least one pin comprising four pins attached to an attachment plate.

25. The attachment mechanism of claim 20, said washer comprising a transparent washer.

26. The attachment mechanism of claim 20, said washer comprising a glass washer.

27. The attachment mechanism of claim 20, further comprising an optically curable adhesive forming said bond between said washer and said socket plate.

28. The attachment mechanism of claim 20, further comprising an optically curable adhesive forming said bond between said washer and said at least one pin.

29. The attachment mechanism of claim 20, further comprising an optically curable adhesive, said washer optically transparent at the wavelengths required to cure said adhesive.

30. The attachment mechanism of claim 20, said socket plate comprising an integral portion of said second component.

31. An attachment mechanism for attaching two components, the mechanism comprising:
    a first component having at least one pin portion;
    a second component having a clearance hole to receive said at least one pin portion;
    at least one washer bonded to said second component, said pin portion entering and bonded to said washer.

32. The attachment mechanism of claim 31, said washer comprising a transparent washer.

33. The attachment mechanism of claim 31, said washer comprising a glass washer.

34. The attachment mechanism of claim 31, further comprising an optically curable adhesive forming said bond between said washer and said socket plate.

35. The attachment mechanism of claim 31, further comprising an optically curable adhesive forming said bond between said washer and said at least one pin portion.

36. The attachment mechanism of claim 31, further comprising an optically curable adhesive, said washer optically transparent at the wavelengths required to cure said adhesive.

* * * * *